H. H. BISHOP.
DEVICE FOR CONVERTING MOTION.
No. 37,806. Patented Mar. 3, 1863.
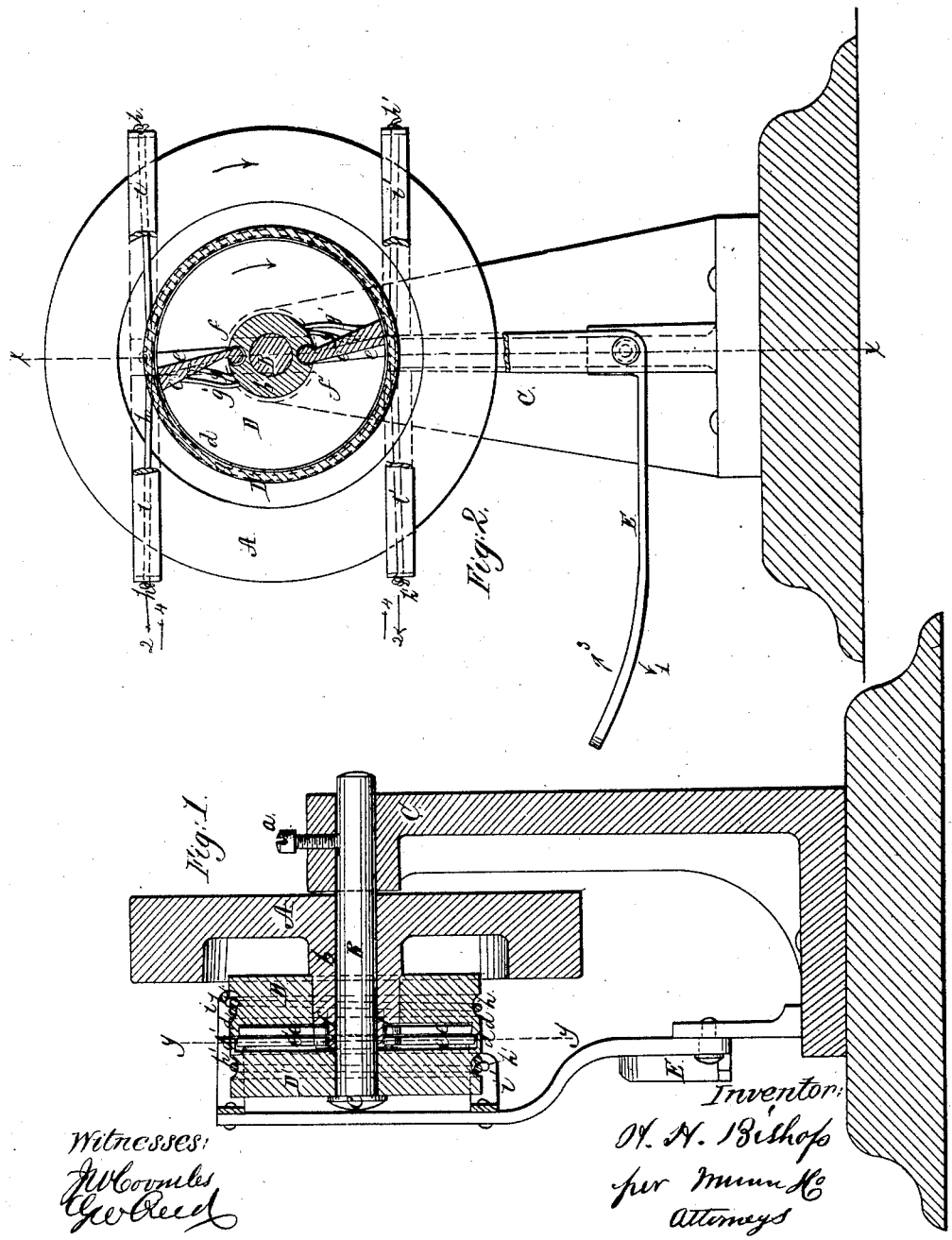

UNITED STATES PATENT OFFICE.

HOBERT HENRY BISHOP, OF BRISTOL, CONNECTICUT.

IMPROVEMENT IN DEVICES FOR CONVERTING MOTION.

Specification forming part of Letters Patent No. 37,806, dated March 3, 1863.

*To all whom it may concern:*

Be it known that I, HOBERT HENRY BISHOP, of Bristol, in the county of Hartford and State of Connecticut, at present residing in Paris, France, have invented a new and Improved Device for Converting Oscillating into Continuous Rotary Motion; and I do hereby declare that the following is a full, clear, and exact descripton of the same, reference being had to the accompanying drawings, forming a part of this specification, in which—

Figure 1 represents a vertical central section of my invention, the line $xx$, Fig. 2, indicating the plane of section. Fig. 2 is a transverse vertical section of the same, taken in the plane indicated by the line $yy$, Fig. 1.

Similar letters of reference in both views indicate corresponding parts.

This invention consists in the arrangement of a treadle with two hooked parallel arms, in combination with two pulleys provided with tangential driving-arms and set to turn the fly-wheel shaft in one and the same direction in such a manner that by the action of the oscillating treadle on the two pulleys a positive continuous rotary motion of the fly-wheel is produced.

To enable those skilled in the art to make and use my invention, I will proceed to describe its construction and operation with reference to the drawings.

A represents the fly-wheel of a sewing-machine or of a lathe, or any other small machine to which it is desired to impart a continuous rotary motion in one direction. This fly-wheel turns freely on a stationary pin, B, which is inserted into the standard or frame C and retained in its place by a set-screw, $a$. The hub $b$ of the fly-wheel A is long enough to pass through a pulley, D, which rotates freely on the same, being prevented moving in a longitudinal direction on one side by a shoulder on the hub, and on the other by a pulley, D', which rotates freely on the central pin, B, and which is prevented from sliding off from the end of said pin by the head $c$, as clearly shown in Fig. 1 of the drawings. Each of the pulleys D D' is provided with a circular rim, $d\,d'$, and arms $e\,e'$, which are inserted into notches $f$ in the end of the hub of the fly-wheel, and bear against the inner surfaces of the rims $d\,d'$. These arms are somewhat longer than the corresponding radii of the rims $d\,d'$, and consequently they have to be brought in a tangential position in order to be able to introduce them into said rims, and they are provided with limber springs $g\,g'$, which hold their outer ends in contact with the inner surfaces of the rims. If either of the pulleys D D' is now turned in the direction of the arrow marked upon them in Fig. 2, the friction on the ends of the corresponding tangential arms $e$ or $e'$ has a tendency to turn said arms into a radial position, and thereby they are caused to bind between the hub and inner surfaces of the rim and to cause a corresponding rotary motion of the fly-wheel A. The inside diameter of the rim $d'$ is somewhat larger than that of the rim $d$, and the arms $e'$ are a little longer than the arms $e$, so that the points of the former slide on the edge of the rim $d$, and that the same are not liable to catch into said rim. Without this precaution the points of the arms $e'$ would be liable to catch in the rim $d$, and the action of the pulley D' would be rendered unsafe, because if such catching should take place the receding motion of the pulley D would prevent the arms $e'$ from acting properly on the rim $d'$ of the pulley D', and this pulley would be liable to rotate in either direction without producing any motion of the fly-wheel; or, if said arms would be permitted to bind simultaneously in both pulleys, the motion of the whole device would be stopped. The outside diameters of the pulleys D D' are equal to each other, and each pulley is provided with a groove to receive the cords $h\,h'$. These cords are made fast to the pulleys D D', and the ends of the cord $h$ from the pulley D are secured to hooked arms $i$, which project in a horizontal direction from the treadle E above the pulleys D D', and the ends of the cords $h'$ are fastened to similar arms, $i'$, which project from the treadle E parallel to the arms $i$, below the pulleys D D', each cord being wound once, or oftener, around its pulley. If the treadle E is now depressed in the direction of arrow 1, Fig. 2, the arms $i\,i'$ move in the direction of arrows 2, and the cord $h'$ turns the pulley D' in the direction of the arrow marked thereon in Fig. 2, whereas the cord $h$ turns the pulley D in the opposite direction. The tangential arms $e'$ are thereby caused to bind on the rim $d'$, and the fly-wheel A rotates in the direction of the arrow marked upon it in Fig. 2. At the same time the arms $e$ slide in the rim $d$. If the treadle rises in the direction of arrow 3, the arms $i\ i'$ move in the direction of arrow 4, and the tangential arms $e$ in the pulley D bend, causing the fly-wheel to rotate in the same direction as before. By this arrangement of the arms $i\ i'$, in combination the cords $h\ h'$ and pulleys D D', the oscillating motion of the treadle is converted into a continuous rotary motion of the fly-wheel.

Having thus described my invention, what I claim as new, and desire to secure by Letters Patent, is—

The combination, with the fly-wheel and its hub $b$, made as represented, of the two arms $e\ e'$, of unequal length, the two pulleys D D', of unequal interior diameters, the cords $h\ h'$, and the hook-armed treadle E, the whole constructed and operating in the manner herein shown and described.

H. H. BISHOP.

Witnesses:
A. GUION,
JAMES W. BROOKS.